United States Patent
Wang et al.

(10) Patent No.: US 12,381,808 B2
(45) Date of Patent: Aug. 5, 2025

(54) TECHNIQUES FOR PROVIDING ROLE STATUS CONFLICT RESOLUTION WITH EVPN MULTI-HOMING

(71) Applicant: Cisco Technology, Inc., San Jose, CA (US)

(72) Inventors: Chuanfa Wang, Ontario (CA); Ali Sajassi, Alamo, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/451,724

(22) Filed: Aug. 17, 2023

(65) Prior Publication Data

US 2025/0062977 A1 Feb. 20, 2025

(51) Int. Cl.
*H04L 45/02* (2022.01)
*H04L 45/74* (2022.01)

(52) U.S. Cl.
CPC .............. *H04L 45/02* (2013.01); *H04L 45/74* (2013.01)

(58) Field of Classification Search
CPC ................................ H04L 45/02; H04L 45/74
USPC ......................................................... 709/238
See application file for complete search history.

(56) References Cited

U.S. PATENT DOCUMENTS

| | | | |
|---|---|---|---|
| 7,463,639 B1 * | 12/2008 | Rekhter | H04L 12/4641 370/467 |
| 11,528,223 B2 | 12/2022 | Yong | |
| 2006/0206656 A1 | 9/2006 | Di Benedetto et al. | |
| 2008/0225754 A1 * | 9/2008 | Jiang | H04L 41/0853 370/255 |
| 2016/0112255 A1 * | 4/2016 | Li | H04L 12/1886 709/220 |
| 2016/0261487 A1 * | 9/2016 | Singh | H04L 45/70 |
| 2018/0102969 A1 * | 4/2018 | Yong | H04L 45/502 |
| 2020/0213155 A1 | 7/2020 | Bickhart et al. | |
| 2021/0218663 A1 * | 7/2021 | Kaliyamoorthy | H04L 41/0866 |
| 2022/0103425 A1 | 3/2022 | Lo et al. | |
| 2023/0073266 A1 * | 3/2023 | Boutros | H04L 45/48 |

FOREIGN PATENT DOCUMENTS

| | | | |
|---|---|---|---|
| CN | 102238057 A | * | 11/2011 |
| WO | WO2013117165 A1 | | 8/2013 |

* cited by examiner

*Primary Examiner* — Suraj M Joshi
*Assistant Examiner* — Ayele F Woldemariam
(74) *Attorney, Agent, or Firm* — Lee & Hayes, P.C.

(57) ABSTRACT

Techniques are described herein for resolving conflicts in role statuses assigned to a customer edge device by multiple provider edge devices in communication with that customer edge device. In embodiments, such techniques may involve receiving information about a customer edge device in communication with the first provider edge device and storing, based on the information about the customer edge device, an indication of a first role status of the customer edge device. The techniques may further involve receiving, from at least one second provider edge device in communication with the customer edge device, an advertisement message that includes a second role status of the customer edge device, comparing the first role status to the second role status, and upon determining that the first role status does not match the second role status, updating the first role status of the customer edge device.

16 Claims, 9 Drawing Sheets

| MAC ADDRESS 405 | FORWARDING INFO 410 | ROOT/LEAF 415 |
|---|---|---|
| MAC-A | PORT-1 | ROOT |
| MAC-B | PORT-2 | LEAF |
| MAC-C | PORT-3 | LEAF |
| ⋮ | ⋮ | ⋮ |

TABLE 400

FIG. 4

TECHNIQUES FOR PROVIDING ROLE STATUS CONFLICT RESOLUTION WITH EVPN MULTI-HOMING

TECHNICAL FIELD

The present disclosure relates generally to network devices and, more particularly, to resolving role status conflicts between network devices in an Ethernet Virtual Private Network (EVPN).

BACKGROUND

A network is a group of interconnected computing devices that can exchange data. A network device is a computing device within the network that is connected to one or more other network devices via one or more physical links. The term "link" is often used to refer to the connection between two devices on a network. The link may be a physical medium, such as a copper wire, a coaxial cable, any of a host of different fiber optic lines, or a wireless connection. In addition, network devices may define "virtual" or "logical" links and map the virtual links to the physical links.

Ethernet is a preferred protocol for many types of networks because it is flexible, decentralized, and scalable. Ethernet comprises a family of frame-based computer networking technologies for local area networks (LANs) and defines a number of wiring and signaling standards for the Physical Layer of the Open Systems Interconnection (OSI) networking model and a common addressing format and Media Access Control (MAC) at the Data Link Layer. Ethernet is flexible in that it allows variable-sized data frames to be transported across different types of mediums using various nodes each having different transmission speeds. Some Ethernet based networks may forward the data frames from one node to another node across the network along pre-configured or pre-established paths. In such cases, the nodes may create Ethernet-LAN (E-LAN) services, where traffic that corresponds to different services may be transported along different sub-networks. For example, the E-LAN services may comprise the Institute of Electrical and Electronics Engineers (IEEE) 802.1 network services or Virtual Private LAN Services (VPLSs).

An Ethernet Virtual Private Network (EVPN) typically operates using an Ethernet Virtual Private Tree (E-TREE) service. An E-TREE service, or rooted point-to-multipoint Ethernet Virtual Connection (EVC), is a Layer 2 service defined by the Metro-Ethernet Forum (MEF) that provides an Ethernet Virtual Local Area Network (VLAN) configuration suitable for multicast services. Illustratively, the Internet Engineering Task Force (IETF) Internet Draft entitled "Requirements for MEF E-TREE Support in VPLS"<draft-ietf-12vpn-etree-reqt> by Key et al. specifies the requirements for supporting MEF E-TREE service in layer-2 virtual private network (L2VPN). Other types of EVCs defined for Carrier Ethernet networking are the E-Line and E-LAN.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 depicts a simplified table that may store MAC addresses, corresponding forwarding information, and a root/leaf indication in accordance with at least some embodiments.

DESCRIPTION OF EXAMPLE EMBODIMENTS

Overview

Figure 1:
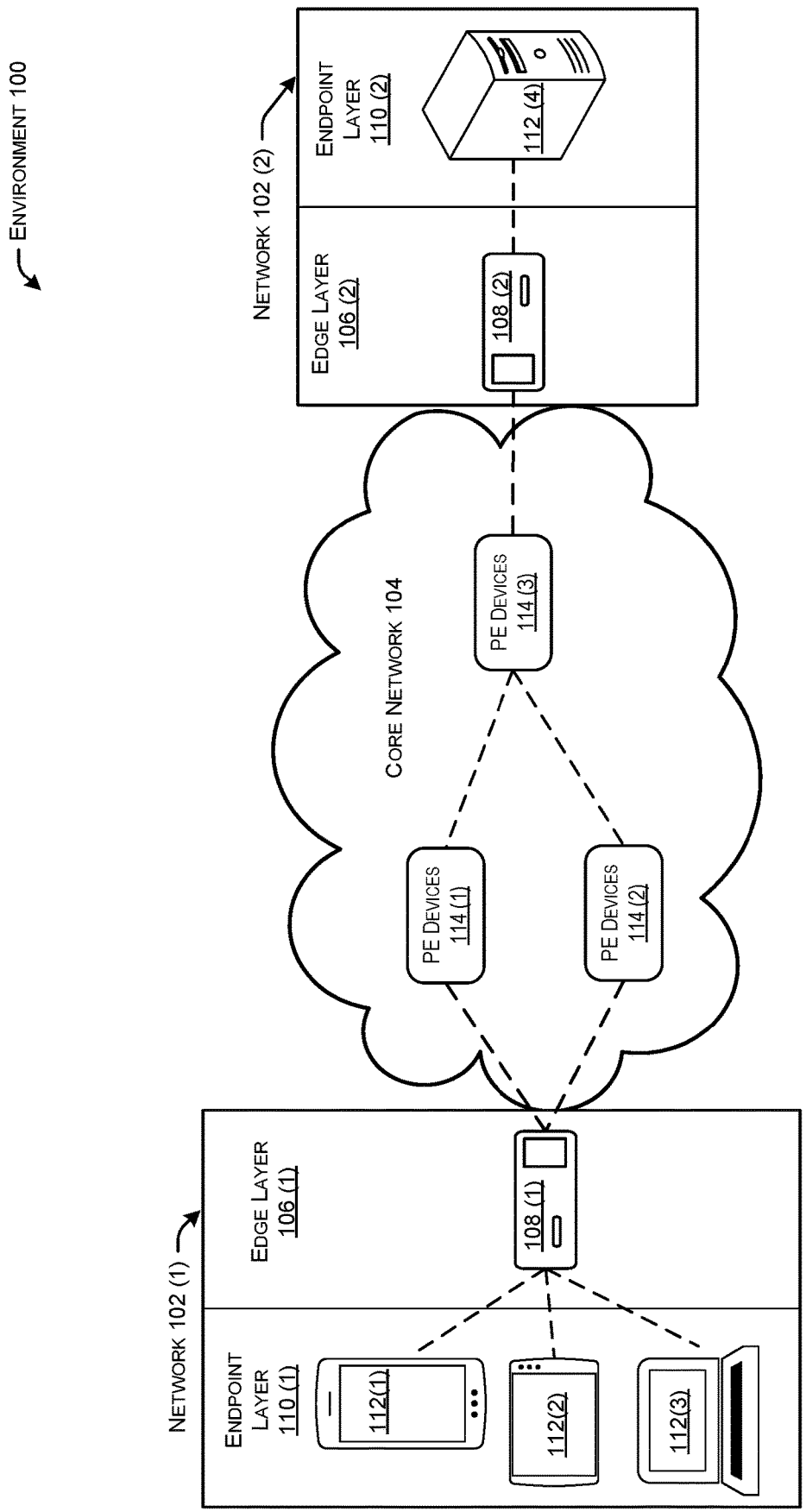
FIG. 1 illustrates a system-architecture diagram showing an environment 100 that includes an example network architecture that may be implemented in accordance with embodiments.

A first method according to the techniques described herein may involve receiving information about a customer edge device in communication with the first provider edge device and storing, based on the information about the customer edge device, an indication of a first role status of the customer edge device. The method may further involve receiving, from at least one second provider edge device in communication with the customer edge device, an advertisement message that includes a second role status of the customer edge device, comparing the first role status to the second role status, and upon determining that the first role status does not match the second role status, updating the first role status of the customer edge device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for resolving conflicts in role statuses assigned to a customer edge device by multiple provider edge devices in communication with that customer edge device. A customer edge device in communication with multiple provider edge devices is often referred to as a "multi-homed" device. When a customer edge device is multi-homed, a conflict may arise in a role status for that customer edge device as maintained by each of the provider edge devices with which it is in communication. In such a scenario, egress filtering, which is typically used to prevent prohibited leaf-to-leaf communication, may not be properly performed, resulting in frames being received by devices that would not normally be authorized to receive such frames. Accordingly, such conflicts should be resolved in order to prevent improper frame transmission.

An EVPN is a modern and versatile network technology used to extend Layer 2 Ethernet connectivity over an IP network. It provides a way to build and manage virtual private networks for Ethernet-based devices, allowing them to communicate across multiple locations as if they were connected to the same local network.

EVPNs leverage BGP (Border Gateway Protocol) to distribute MAC (Media Access Control) address information across the network, making it highly scalable and efficient. The main components of an EVPN are:

1. Ethernet Segments: These are the local Ethernet networks that need to be interconnected over the IP network.
2. Ethernet Virtual Private Networks (EVPN): These are the overlay networks created using BGP to establish Layer 2 connectivity between Ethernet segments across different locations.
3. MAC Address Learning: EVPN uses a MAC learning process, where Ethernet switches learn MAC addresses associated with each Ethernet segment associated with a respective customer edge device. This information is then shared among all the switches using BGP.
4. Integrated Routing and Bridging (IRB): EVPN supports IRB, which enables communication between devices on different subnets through the IP network.

EVPNs are widely used in data centers, multi-site enterprises, and service provider networks to build scalable and flexible Layer 2 connectivity for applications that require the same LAN-like experience across geographically dispersed locations. This technology enables efficient traffic routing, redundancy, and seamless communication between devices, making it a powerful solution for modern networking challenges.

In embodiments, each provider edge device, upon receiving information about a customer edge device in communication with it, may be configured to generate and transmit an advertisement message that includes information about that customer edge device. For example, the provider edge device may generate an advertisement message that includes at least an identifier and a role status for a customer edge device. This advertisement message is transmitted to other devices on the network, including other provider edge devices. Upon receiving an advertisement message, the provider edge device determines if the referenced customer edge device is local to that provider edge device and, if so, then determines (based on whether the role status in the advertisement message matches a role status stored in a table) whether there is a conflict. Upon detecting such a conflict, the provider edge device may either update its stored role status value or generate a second advertisement message in order to cause another provider edge device to update its status.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram showing an environment 100 that includes an example network architecture that may be implemented in accordance with embodiments. Particularly, the example network architecture may include a number of customer networks (102 (1-2)) that are in communication via a core network 104.

An Ethernet Virtual Private Network (EVPN) may be used to extend two or more remote layer two (L2) customer networks (102 (1-2)) through a core layer three (L3) network 104 (usually referred to as a provider network or core network). In particular, the EVPN transports L2 communications, such as Ethernet packets or "frames," between customer networks 102 via traffic engineered label switched paths (LSP) through the core network 104 in accordance with one or more multiprotocol label switching (MPLS) protocols. In a typical configuration, PE devices coupled to the CE network devices of the customer networks define label switched paths (LSPs) within the provider network to carry encapsulated L2 communications as if these customer networks were directly attached to the same local area network (LAN). In some configurations, the PE devices may also be connected by an IP infrastructure in which case IP/GRE tunneling or other IP tunneling can be used between the network devices.

In embodiments, each of the customer networks 102 may include multiple layers. For example, a customer network 102 may include an edge layer 106 (1-2) that includes a number of customer edge (CE) devices 108 (1-2) that provide egress/ingress to the respective customer network 102. CE devices 108 may include electronic devices such as routers and/or switches. In another example, the customer network 102 may include an endpoint layer 110 (1-2) that includes a number of endpoint devices 112 (1-4). Endpoint devices 112 may include a number of different types of electronic devices. For example, endpoint devices 112 (1-4) are depicted as a mobile phone, tablet-type device, laptop, and desktop computer, respectively. It should be noted that a wide variety of devices are contemplated as an endpoint device 112. The depiction of any particular type of device is for illustration purposes only and is not meant to be limiting.

The core network 104 may include a number of provider edge (PE) devices 114 (1-3) that are configured to provide egress/ingress to the core network 104. In embodiments, PE devices may include any suitable electronic device capable of routing data packets. For example, the PE device may include a server, switch, router, hub, bridge, gateway, modem, repeater, access point, host, or other type of computing device. In embodiments, CE devices of a customer network 102 may connect to PE devices that that include a plurality of ports (e.g., edge devices) In these PE devices, each port may be associated with a E-Tree service, where each of the ports may be configured as a root port or a leaf port (but not both). The root ports and the leaf ports in the PE devices may exchange data frames with other PE devices in the core network 104 using the E-Tree service. Additionally. A root port or a leaf port in a PE device also may be coupled to a CE device 108 of a customer network 102 and exchange data with devices operating on that customer network 102.

Each of the CE devices 108 in a customer network 102 may be connected to one or more PE devices. More particularly, a PE device may maintain a plurality of ports, with each port being assigned to one of its local (e.g., connected) CE devices. Each of the PE devices also maintains information about an identifier or address associated with its local CE devices. For example, the PE device may maintain information about a MAC address associated with each of its ports. Additionally, the PE device may maintain information about whether the respective port is a leaf port or a root port based on whether the respective CE device is a root device or leaf device.

In some embodiments, a customer network may be given redundant connectivity to a core network by connecting a CE device with multiple PE devices. This form of redundancy is referred to as "multi-homing." In one type of multi-homing, referred to as "active-active" multi-chassis link aggregation (MC-LAG) configuration, each of the PE devices is configured to actively forward traffic and the multiple, physical links providing the multi-homed connectivity are logically aggregated and treated as a single, logical link. In MC-LAG configured networks, MC-LAG enables a CE network device to form a logical LAG interface between two MC-LAG peer nodes.

The CE devices 108 as well as the PE devices 114 may act as network nodes that support transportation of frames and/or packets through the various networks in the environment 100. Such devices may each be configured to support an E-Tree service to transfer frames across devices. Example solutions for supporting E-Tree services in MPLS/VPLS based networks have been described in the IETF Pseudowire Emulation Edge to Edge version 3 (PWE3) workgroup (WG) and the L2VPN WG, such as discussed in the IETF documents draft-key-12vpn-etree-frwk-04 (E-Tree-Frwk), draft-key-12vpn-vpls-etree-02 (VPLS-E-Tree), and draft-simon-pwe3-cw-bit-01 (CW-LBit), all of which are incorporated herein by reference.

In operation, the various components of the environment 100 may be configured to relay network traffic (e.g., frames/packets) between each other. Before a CE device 108 can operate on the core network, it may need to be connected to at least one PE device 114 and registered with the core network 104. In some embodiments, the CE device 108 may perform a device discovery process in which it is configured to detect one or more PE devices 108 to which it may be connected. During a registration, or enrollment, process, the CE device 108 may provide information to the PE device 114 that can be used to register the CE device with the core network 104. In embodiments, that information may include an identifier (e.g., a MAC address) as well as information about whether the CE device is a root device or a leaf device. In embodiments, the PE device may store the information provided by the CE device in a table, such as a forwarding table 400 as described in relation to FIG. 4 below. In embodiments, the PE device may provide a response to the CE device that includes access credentials to be used in communicating over the core network 104.

As noted above, a single CE device 108 (1) may be registered with multiple PE devices 114 (1 and 2). In such cases, the CE device 108 may be registered with each of the multiple PE devices. In such embodiments, each time that a PE device 114 registers a local CE device (e.g., by storing information related to that CE device in a forwarding table) it may provide an advertisement message to other PE devices 114 in the core network 104 that includes information about that CE device 108. For example, the PE device may transmit an advertisement message to other PE devices that includes an identifier for the CE device (e.g., a MAC address) and indicating whether the CE device is a root device or a leaf device.

Upon receiving an advertisement message from another PE device, the receiving PE device may determine whether a CE device referenced in the advertisement message is a local CE device to that receiving PE device. For example, the receiving PE device may determine, based on a MAC address, whether the CE device referenced in the advertisement message is also included in a forwarding table in the memory of the receiving PE device. If a determination is made that the CE device referenced in the advertisement message is a local CE device to that receiving PE device, then a determination may further be made as to whether the indicated role status of the CE device (e.g., leaf or root) in the advertisement message matches the indicated role status of the CE device as stored in the forwarding table.

If the role status of a CE device local to a PE device is determined to be different as between information included in a forwarding table and an advertisement message, then the PE device may determine whether the information included in the forwarding table should be updated. In some embodiments, a determination is made that the information included in the forwarding table based on whether a role status in that forwarding table matches a default role status. For example, upon determining that the role status of the CE device in the forwarding table does not match the role status in the advertisement message (e.g., a conflict), the role status in the forwarding table may be updated if it is of a particular role status. By way of illustration, the role status of the CE device may be updated in the forwarding table from root to leaf, but not from leaf to root. In some cases, upon determining that the role status of the CE device in the forwarding table does not match the role status in the advertisement message, the PE device that received the advertisement message may, upon determining that the role status of the CE device in the forwarding table should not be updated, generate and transmit a second advertisement message related to the CE device. In some embodiments, the second advertisement message may be transmitted to all other PE devices. In other embodiments, the second advertisement message may be transmitted to the PE device from which the first advertisement message was received. In these embodiments, the PE device that receives the second advertisement message may update a role status of the CE device within a forwarding table stored in memory of that PE device.

Figure 2:
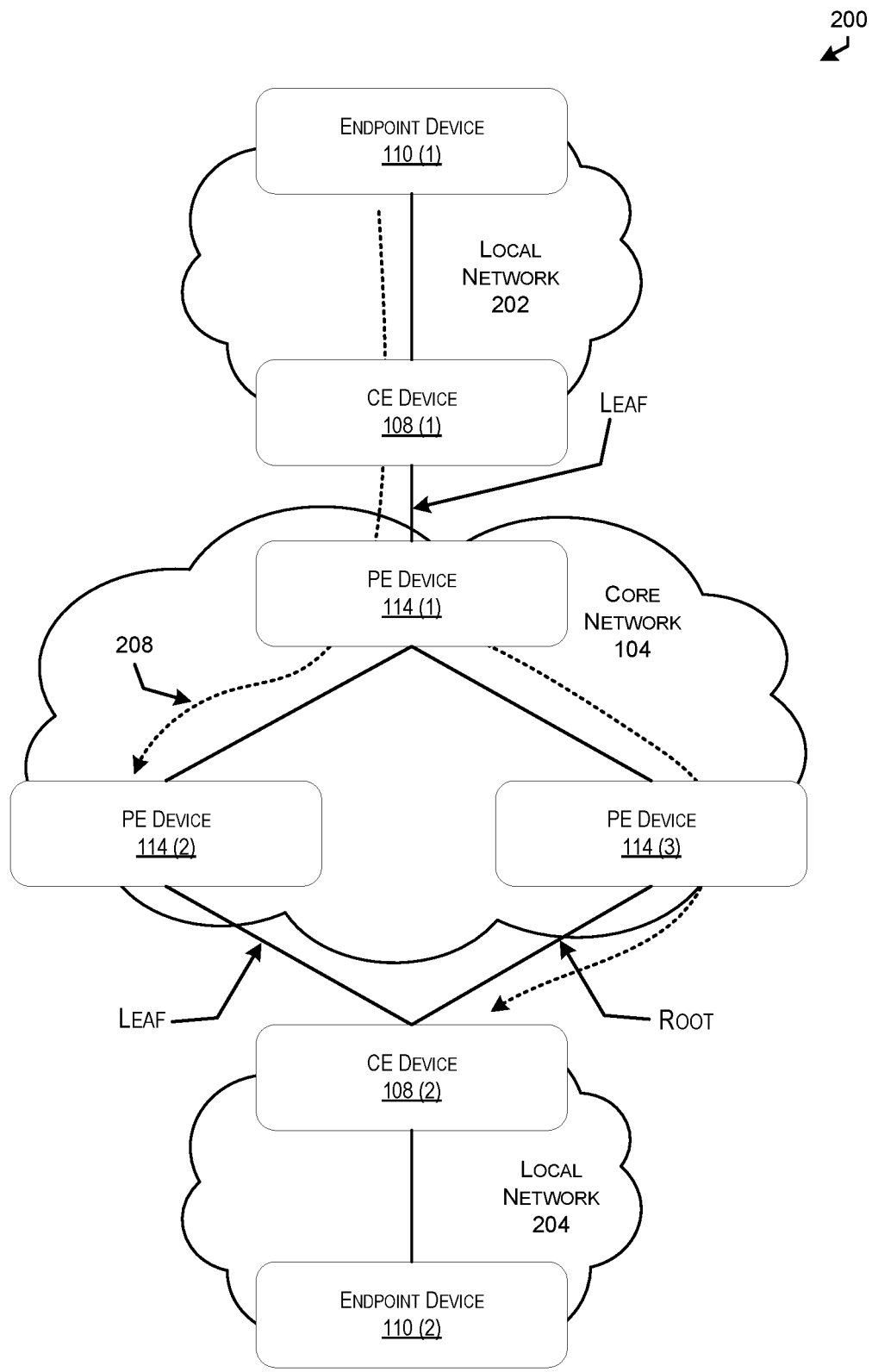
FIG. 2 depicts an example of a process of frame transmission across a core network having PE devices with conflicting role statuses for a CE device in accordance with some embodiments.

FIG. 2 depicts an example of a process of frame transmission across a core network having PE devices with conflicting role statuses for a CE device in accordance with some embodiments. As depicted, the process 200 may involve interactions between various components as described in relation to FIG. 1 above. For example, a core network 104 may include (amongst other devices) a number of PE devices 114 (1-3) that are configured to relay frames between network devices. In this example, the core network 104 may connect multiple local networks 202 and 204. Each of those local networks 202 and 204 may include CE devices 108 (1-2) in communication with (and associated with) the PE devices 114.

In an example process 200 as depicted in FIG. 2, a frame 208 is generated by a first endpoint device 112 (1) that is to be transmitted to at least one second endpoint device 112 (2). In the process 200, the frame 208 is transmitted by the endpoint device 112 (1) to a CE device 108 (1) via a communication connection over the first local network 202. The frame is then transmitted to a PE device 114 (1) in communication with the CE device 108 (1). It should be noted that, for the purposes of this example, the CE device 108 (1) may be classified as a leaf device.

The PE device 114 (1) may relay the frame 208 to a number of other PE devices 114 (2 and 3) within the core network 104. In some cases, the PE device 114 forwards the frame 208 to additional PE devices in the core network 104. Each of those PE devices 114 may, upon receiving the frame, determine if the frame should be relayed to a CE device 108 with which it is in communication. In some cases, this may involve performing a lookup in a forwarding table (e.g., as described in relation to FIG. 4 below).

If a determination is made (e.g., based on an indicated destination of the frame) that the frame should be sent to a CE device with which it is in communication, a PE device may make a determination as to whether the frame originated at a leaf or a root based on the included indicator. If the frame is determined to have originated at a root device, then the frame may be forwarded to its destination regardless of a type of that destination device. Otherwise (e.g., if the frame originated at a leaf device), a determination may be made as to whether that CE device is a root or a leaf device. In this case, since the frame originated at a leaf device, the PE device may only forward the frame to a root device. Accordingly, the PE device may drop the frame if it originated at a leaf device and is destined for another leaf device.

In an example of the process 200, a frame is generated by the CE device 108 (1), which is a leaf device. The frame is relayed by the CE device 108 (1) to the PE device 114 (1) with which it is in communication. The PE device 114 (1) then relays the frame to a number of other PE devices operating within the core network 104, including PE devices 114 (2 and 3).

For the purposes of this example, consider that the CE device 108 (2) is a leaf device. Accordingly, a frame originating at the CE device 108 (1), which is also a leaf device, should not be provided to the CE device 108 (2) as that would involve prohibited leaf-to-leaf communication.

Continuing with the above example, the frame may be received at multiple PE devices, including PE devices 114 (2) and 114 (3). Each of those PE devices may have stored an indication of a role status of CE devices local to it. In this example, note that the PE device 114 (2) has correctly stored an indication that the CE device 108 (2) is a leaf device whereas the PE device 114 (3) has incorrectly stored an indication that the CE device 108 (2) is a root device. This represents a conflict between the two PE devices. Note that a conflict may arise from a number of different scenarios. Upon receiving the frame, the PE device 114 (2) may drop the frame, preventing transmission to the CE device 108 (2). However, upon receiving the same frame, the PE device 114 (3) may (because of the conflicting role status of the CE device) inappropriately forward the frame to the CE device 108 (2).

In order to prevent the scenario above, conflicts between status information stored by the PE devices should be resolved. In some cases, such conflicts may automatically be resolved in the manner that is most restrictive. In other words, given a conflict in which one PE device indicates that a local CE device is a leaf device and another PE device indicates that the local CE device is a root device, the system may be configured to cause the role status of the CE device at both PE devices to be updated to "Leaf," thereby preventing transmission of some communications to that device.

Figure 3:
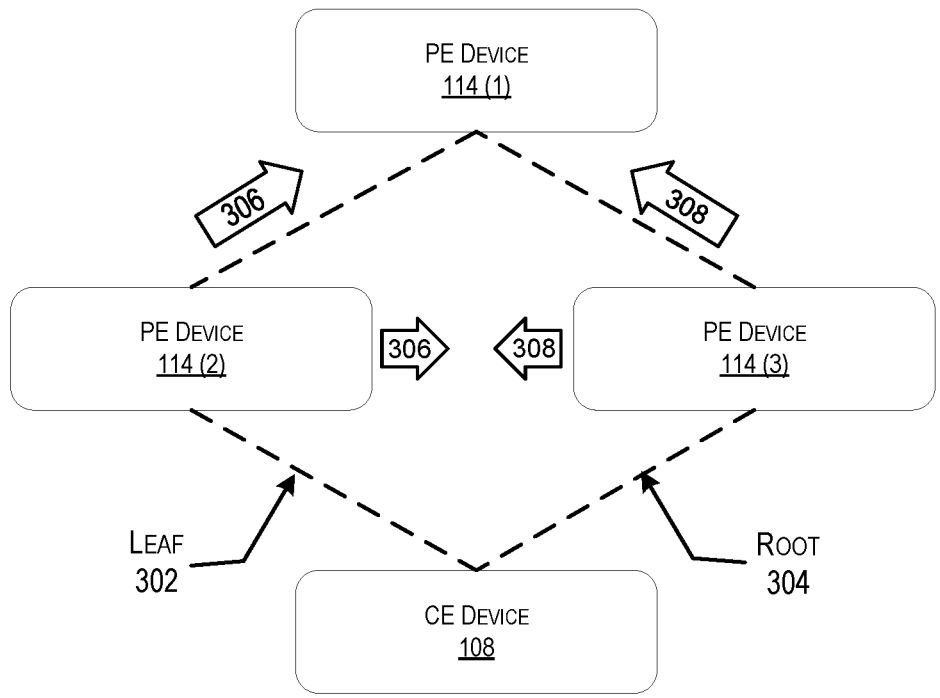
FIG. 3 depicts an example of a process of conflict resolution to be performed across a core network having PE devices with conflicting role statuses in accordance with some embodiments.
Figure 3:
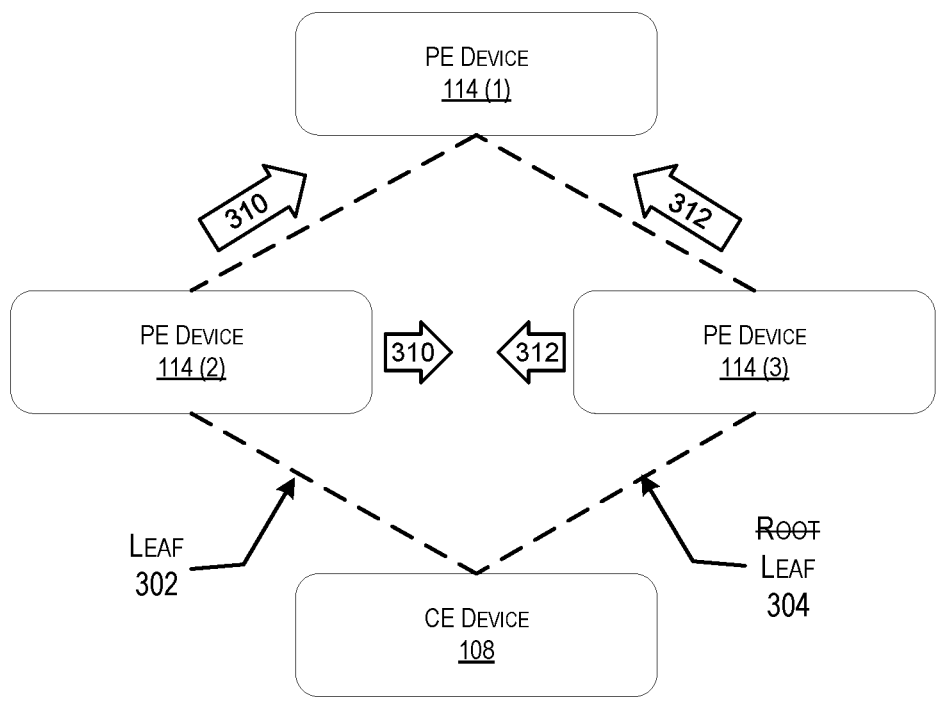

FIG. 3 depicts an example of a process of conflict resolution to be performed across a core network having PE devices with conflicting role statuses in accordance with some embodiments. As depicted, the process 300 may involve interactions between various components as described in relation to FIG. 1 above. For example, a core network 104 may include (amongst other devices) a number of PE devices 114 (1-3) that are configured to relay frames between network devices. In this example, the core network 104 may be in communication with one or more CE device 108 via a communication channel established with (and associated with) the PE devices 114.

In an example process 300 as depicted in FIG. 3, a CE device 108 initially establishes communication with multiple PE devices 114 (e.g., 2 and 3). As noted elsewhere, the CE device may establish communication with the PE devices in order to operate over the core network 104. This may involve the CE device 108 providing each of the PE devices 114 with information that includes at least a role status for that CE device. The information provided by the CE device to a PE device may be stored by the respective CE device within a table in memory of the PE device. In some cases, the PE device may store an indication of a determined role status for the CE device in relation to a port used to communicate with the CE device.

It should be noted that a conflict can occur when multiple PE devices store information about the CE device and one PE device stores an indication of an incorrect role status for a CE device. While this may occur for a number of different reasons, the result is that the role status for a single CE device may vary across the multiple PE devices with which that CE device is in communication. By way of illustration, the PE device 114 (2) may store an indication that a CE device has a leaf role status whereas the PE device 114 (3) may store an indication that the same CE device has a root role status. Note that this can be problematic in that if a CE device is incorrectly indicated as being a root device, it may be provided with frames originating at a leaf device, resulting in prohibited leaf-to-leaf communication.

In embodiments, when a PE device has been connected to a local CE device (e.g., when the CE device is registered with the core network), that PE device may generate an advertisement message that is sent to other devices (e.g., other PE devices) operating on the core network. The advertisement message may include information about the CE device to which the PE device has been connected, such as an indication of a role status for that CE device.

Upon receiving an advertisement message from another PE device, a receiving PE device may determine whether the CE device related to that advertisement message is also local to the receiving PE device. Upon determining that the CE device is also local to the receiving PE device, the receiving PE device may determine whether the indicated role status matches a role status for the CE device that is stored in a memory of that PE device (e.g., within a forwarding table). If the two role statuses match, then the PE device may take no further action. If the two role statuses do not match, however, then the PE device may determine whether the role status should be updated. Such a determination may be made based on a policy stored by the PE device. In some cases, such a policy may indicate that in the event of a conflict, the conflict should be resolved in a particular manner (e.g., the role status should be updated to "leaf" at each of the PE devices). In some cases, such a policy may indicate that in the event of a conflict, the link (e.g., port) associated with the conflict should be blocked or deactivated. In some cases, the role status may be updated if it is of a particular value. In some cases, a query is provided to the CE device to retrieve information from the CE device. In such cases, the role status for the CE device may be updated based on a response received to the query from the CE device.

If, upon receiving an advertisement message that includes a conflicting role status, a determination is made (based on the stored policy data) that the role status for the receiving PE device is not to be updated, then that PE device may resend the previously sent advertisement message that includes an indication of the role status as stored in relation to the CE device by that PE device. This would be expected to result in the incorrect role status as stored by other PE devices to be updated.

In embodiments, conflicts may be resolved by setting a role status for a CE device to a predetermined value at each of the PE devices in communication with that CE device. For example, rather than attempt to determine whether the CE device should be considered a root or leaf in order to correct a conflict, each PE device may be configured to resolve the conflict by automatically setting the role status to leaf on each of the PE devices. This results in the most conservative approach, which prevents erroneous leaf-to-leaf communication.

By way of illustration, consider the example depicted in FIG. 3 in which a CE device 108 establishes communication with two different PE devices 114 (2 and 3) operating on a core network. In this example, the CE device 108 may establish communication with the two PE devices 114 at different times. Each of the PE devices may maintain an indication of a role status for the CE device. For example, the PE device 114 (2) may store an indication of a first role status 302 and the PE device 114 (3) may store an indication of a second role status 304.

Consider that the CE device 108 establishes communication with the PE device 114 (2) before it establishes communication with the PE device 114 (3). In this scenario, the PE device 114 (2) may generate an initial advertisement message 306 that is broadcast to other devices on the core network (including the other PE devices 114 (1 and 3)). In this scenario, the PE device 114 (3) receives the advertisement message but, because the CE device has not yet established communication with PE device 114 (3), takes no action. Subsequently, the PE device 114 (3), upon establishing communication with the CE device 108, generates an advertisement message 308 that is broadcast to other devices on the network (including the other PE devices 114 (1 and 2)).

Upon receiving the advertisement message 308, the PE device may detect the conflict by virtue of the PE device 114 (3) indicating that the CE device 108 has a role status of "root" whereas the PE device 114 (2) has a role status of "leaf." However, the PE device 114 (2) may further determine (e.g., based on policy data stored by the PE device) that the role status that it has stored should not be updated. Upon making that determination, the PE device 114 (2) resends the advertisement message 306, (represented as advertisement message 310) that is broadcast to other devices on the network (including the other PE devices 114 (1 and 3)). Because the CE device 108 is now a local CE device to the PE device 114 (3), the PE device 114 (3), upon receiving the advertisement message 306/310, would then update the respective role status 304 to indicate that the CE device 108 is a leaf.

In embodiments, once the PE device 114 (3) has updated the role status of the CE device 108 (2) to reflect that it is now determined to be a leaf device, the PE device 114 (3) may generate and send a new advertisement message 312 that indicates the updated role status. Similar to the advertisement message 308 as described above, the advertisement message 312 may be broadcast to a number of other devices operating on the core network, including PE devices 114 (1 and 2).

FIG. 4 depicts a simplified table 400 (e.g., forwarding table) that may store MAC addresses 405, corresponding forwarding information 410, and a root/leaf indication in accordance with embodiments. Those skilled in the art will appreciate that the simplified table 400 is merely for illustration and is not meant to be limiting to the scope of the embodiments herein (e.g., other information and/or formats may achieve similar results yet may still be used in accordance with the techniques herein to indicate whether the address was learned over a Root or Leaf segment).

The forwarding table 400 illustrated herein may be specific to a PE device on which the forwarding table is stored. In other words, the forwarding table stored on a PE device may include information about devices that are local to (e.g., in communication with) that PE device.

According to the techniques herein, when a PE device receives a registration/enrollment message from a CE device (e.g., when a CE device is connected to the network), it adds/updates the "Root/Leaf" indication on a per MAC address basis in its forwarding table. This may be a single-bit flag associated with every MAC address table entry. As such, when the PE receives an advertisement message from another PE device in relation to a CE device associated with a given MAC address, it would (provided that the MAC address is determined to correspond to a local device) then:
1. Determine whether the advertisement message indicates that the CE device is a root or leaf device; and
2. Perform a MAC address table lookup on the MAC address to determine whether the destination corresponds to a root or leaf.
3. Detect a conflict based on whether the information included in the advertisement message matches the information in the forwarding table.

The PE device can then decide whether to update the information in the forwarding table, or generate and transmit a new advertisement message, based on a conflict being detected.

Figure 5:
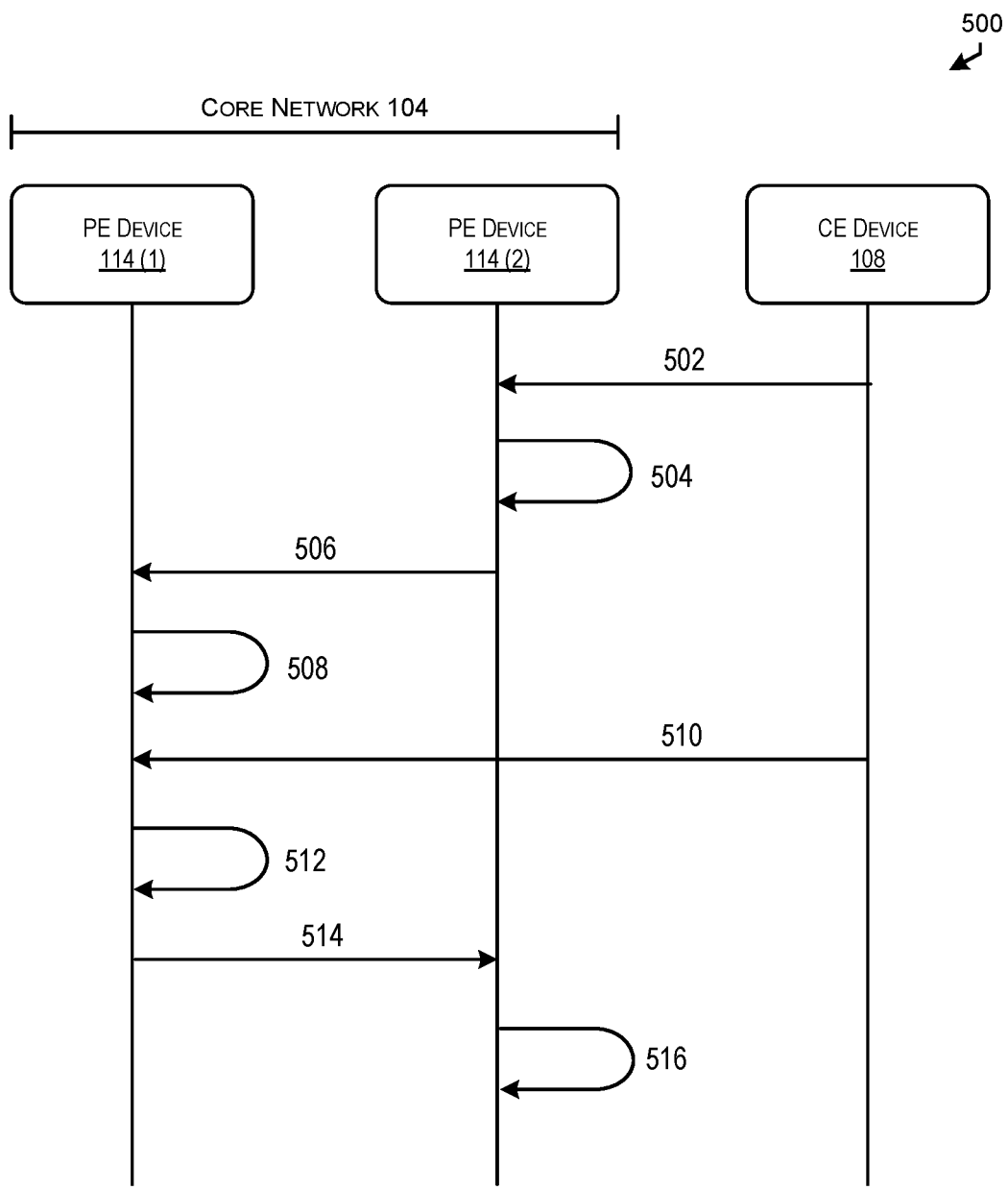
FIG. 5 depicts a swim lane diagram illustrating an exemplary process for updating status information for a customer edge device in order to resolve conflicts in accordance with embodiments.

FIG. 5 depicts a swim lane diagram illustrating an exemplary process for updating status information for a customer edge device in order to resolve conflicts in accordance with embodiments. As depicted, the process 500 may involve interactions between various components as described in relation to FIG. 1 above. For example, the interactions may be performed by devices operating on a core network 104, including PE devices 114 (1 and 2), and a CE device 108. As noted elsewhere, a CE device may be a network device that manages access to a local network, such as a Wireless Local Area Network (WLAN).

At 502 of the process 500, a CE device 108 establishes communication with a PE device 114 (2) that manages access to a core network 104. During this step, the CE device 108 provides information to the PE device 114 (2) that can be used to register, or enroll, the CE device 108 with the core network 104. In embodiments, the information provided by the CE device may include at least an identifier for the CE device (e.g., a MAC address) as well as other information that can be used to identify and/or authenticate the CE device or a user of the CE device. Additionally, the information provided by the CE device may include information about settings and/or capabilities of that CE device. For example, the information may include an indication of configuration settings, protocols (e.g., communication and/or security protocols) used by the CE device, security certificates included on the CE device, and any other suitable information. In some embodiments, the CE device provides an indication of its own role status (e.g., root or leaf). In other embodiments, the PE device may be configured to determine the role status of the CE device based on the information provided by the CE device (e.g., device type, configuration settings, operational parameters, etc.) as well as based on policy data maintained by the respective PE device.

In embodiments, the PE device 114 (2) may provide the CE device 108 with information that can be used to complete an enrollment process. In some embodiments, the PE device 114 (2) may relay the information received from the CE device 108 to a backend server in order to complete an enrollment process. For example, upon receiving information from a CE device to be used to complete an enrollment process, the PE device may be configured to provide at least an identifier (e.g., a MAC address or serial number) for the CE device to the backend server, which may then identify one or more of a device type, a user, an account, or a service that is associated with that CE device based on the provided identifier. In some cases, the backend server provides information to the PE device that can be used by the CE device to access the core network 104 that is then conveyed to the CE device by the PE device. For example, the backend server may provide access credentials (e.g., login and/or password information) that can be used by the CE device to access the core network. In another example, the backend server may provide one or more encryption keys that can be used by the CE device to access communications received via the core network 104.

At 504 of the process 500, the PE device 114 (2) may store in memory information about the CE device 108. For example, the PE device 114 (2) may store an indication of a role status for the CE device. As noted elsewhere, the information about the CE device may be stored by the PE device 114 (2) in a table (e.g., forwarding table 400 as described in FIG. 4 above). As noted elsewhere, in some cases the PE device may determine the role status associated with the CE device based on the information provided by the CE device.

At 506 of the process 500, the PE device 114 (2) may generate an initial advertisement message that is broadcast to other devices on the core network (including the other PE device 114 (1)). The initial advertisement message may include information about the CE device, such as an identifier for the CE device as well as an indication of the role status as stored by the PE device 114 (2).

At 508 of the process 500, the PE device 114 (1) receives the initial advertisement message and makes a determination as to whether the CE device 108 is a local CE device based on whether information for the CE device is included in a table maintained by the PE device 114 (1). In the depicted example, because the CE device has not yet established a connection with the PE device 114 (1), the PE device 114 (1) may determine that the CE device 108 is not a local device. Hence, the PE device 114 (1) takes no further action in this scenario based on the initial advertisement message.

At 510 of the process 500, the CE device establishes communication with the PE device 114 (1). At this step, the CE device provides the information about itself to the second PE device.

At 512 of the process 500, similar to the step at 504, the PE device 114 (1)) may store in memory information about the CE device 108. For example, the PE device 114 (1) may determine and store an indication of a role status for the CE device. As noted above, such a determination may be made based on the information provided by the CE device at 510.

At 514 of the process 500, similar to 506 above, the PE device 114 (1) may generate a second advertisement message that is broadcast to other devices on the core network 104 (including the other PE device 114 (2)). The second advertisement message may include information about the CE device, such as an identifier for the CE device as well as an indication of the role status as stored by the PE device 114 (1).

At 516 of the process 500, the PE device 114 (2) receives the second advertisement message and makes a determination as to whether the CE device 108 is a local CE device based on whether information for the CE device is included in a table maintained by the PE device 114 (2). In this case, because the CE device 108 has already established communication with the PE device 114 (2), and because information about the CE device 108 has already been stored by the PE device 114 (2), the CE device is determined to be local to the PE device 114 (2).

Upon determining that the second advertisement message relates to a local CE device, the PE device 114 (2) may then determine whether the role status indicated in the second advertisement message matches a role status retrieved from the table in memory. If the two role statuses match, then a determination is made that there is no conflict and no further action is taken. If, however, a determination is made that the two role statuses do not match (e.g., there is a conflict), then a further determination may be made as to whether the role status value as maintained by the PE device 114 (2) should be updated. If a determination is made that the role status value maintained by the PE device 114 (2) should be updated, then the PE device 114 (2) updates the value in its memory. Otherwise, the PE device 114 (2) may generate and broadcast a third advertisement message that includes the current value of the role status as maintained by the PE device 114 (2). Upon receiving the third advertisement message, the PE device 114 (1) should be caused to update its value for the role status of the CE device 108.

It should be noted that while techniques are described herein for resolving conflicts arising from mismatched role statuses by updating information maintained by one or more PE devices, alternative embodiments may cause one or more links (e.g., ports) to local CE devices to be blocked, or otherwise disabled, based on conflicts. For example, where two (or more) PE devices identify a conflict between roles statuses for a single CE device, each of the two PE devices may, instead of attempting to resolve the conflict, be configured to deactivate or block a port used to communicate with the respective CE device, thereby preventing improper frame transmission.

Figure 6:
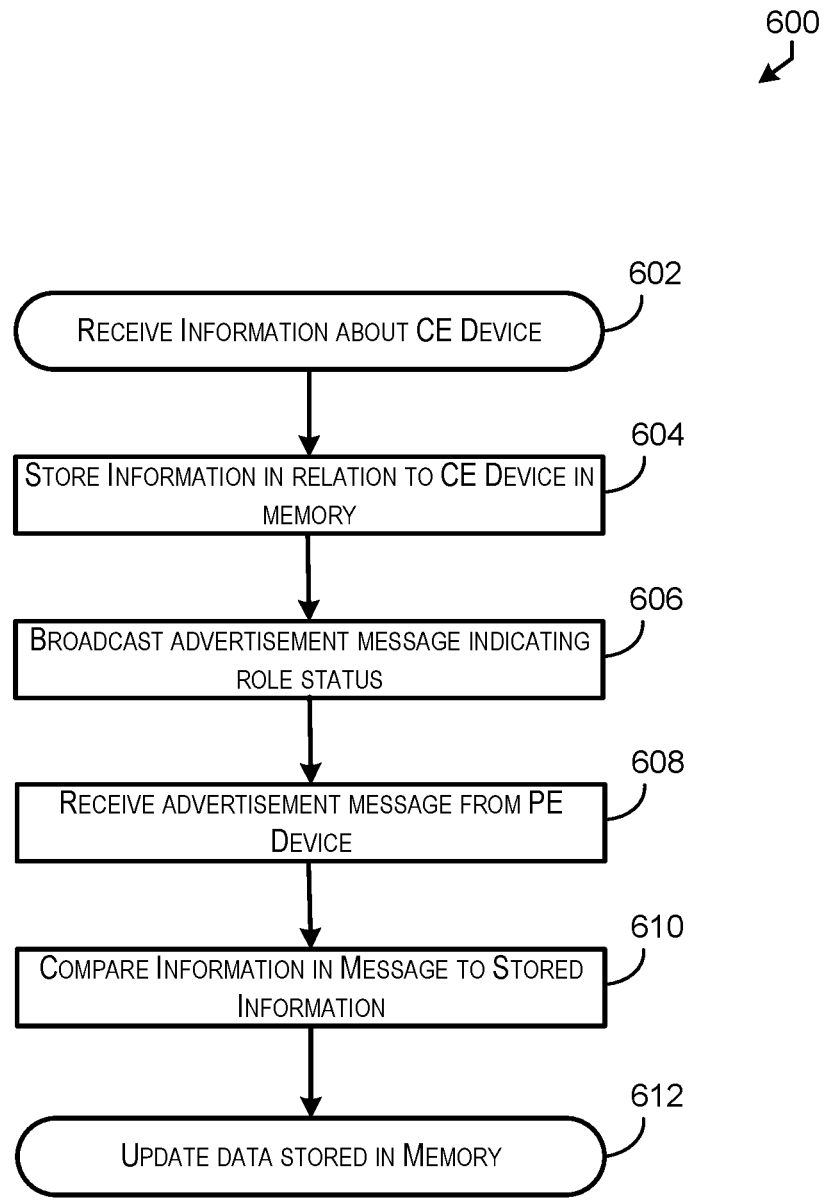
FIG. 6 depicts a flow diagram illustrating an exemplary process for performing filtering of frames in accordance with at least some embodiments.

FIG. 6 depicts a flow diagram illustrating an exemplary process for performing filtering of frames in accordance with at least some embodiments. The process 600 may be performed by a provider edge device, such as the provider edge device 114 as described in relation to FIG. 1 above. In embodiments, a provider edge device manages access to a core network.

At 602, the process 600 may involve receiving, by a provider edge device, information about a customer edge device in communication with the provider edge device. In embodiments, the customer edge device manages access to a local network. In some embodiments, the information about the customer edge device is received during an enrollment of the customer edge device with the core network.

At 604, the process 600 may involve storing information in relation to a customer edge device in memory of the provider edge device. In embodiments, such information may include at least an identifier (e.g., a Media Access Control (MAC) address), an indication of a port used to communicate with the customer edge device, and an indication of a role status associated with the customer edge device. In some embodiments, the information may be stored in a forwarding table, such as the forwarding table 400 as described in relation to FIG. 4 above.

At 606, the process 600 may involve generating and broadcasting an advertisement message indicating a role status for the customer edge device. In embodiments in which the provider edge device manages access to a core network, the advertisement message may be transmitted to other provider edge devices operating on that core network.

At 608, the process 600 may involve receiving a second advertisement message from a second provider edge device indicating a second role status. Such a second advertisement message may be generated and broadcast by a second provider edge device upon receiving information about the customer edge device when communication is established between the second provider edge device and the customer edge device.

At 610, the process 600 may involve comparing information in the second advertisement message to information stored information in order to detect a conflict. In embodiments, detecting a conflict comprises determining that the first role status does not match the second role status.

At 612, the process 600 may involve updating data stored in memory of the provider edge device. In some embodiments, the first role status of the customer edge device is updated if the second role status indicates a leaf device.

In some embodiments, the process 600 may further involve generating a second advertisement message that includes an indication of the first role status and transmitting the second advertisement message to the at least one second provider edge device. In embodiments, the second advertisement message is transmitted to other provider edge devices operating on a core network.

Figure 7:
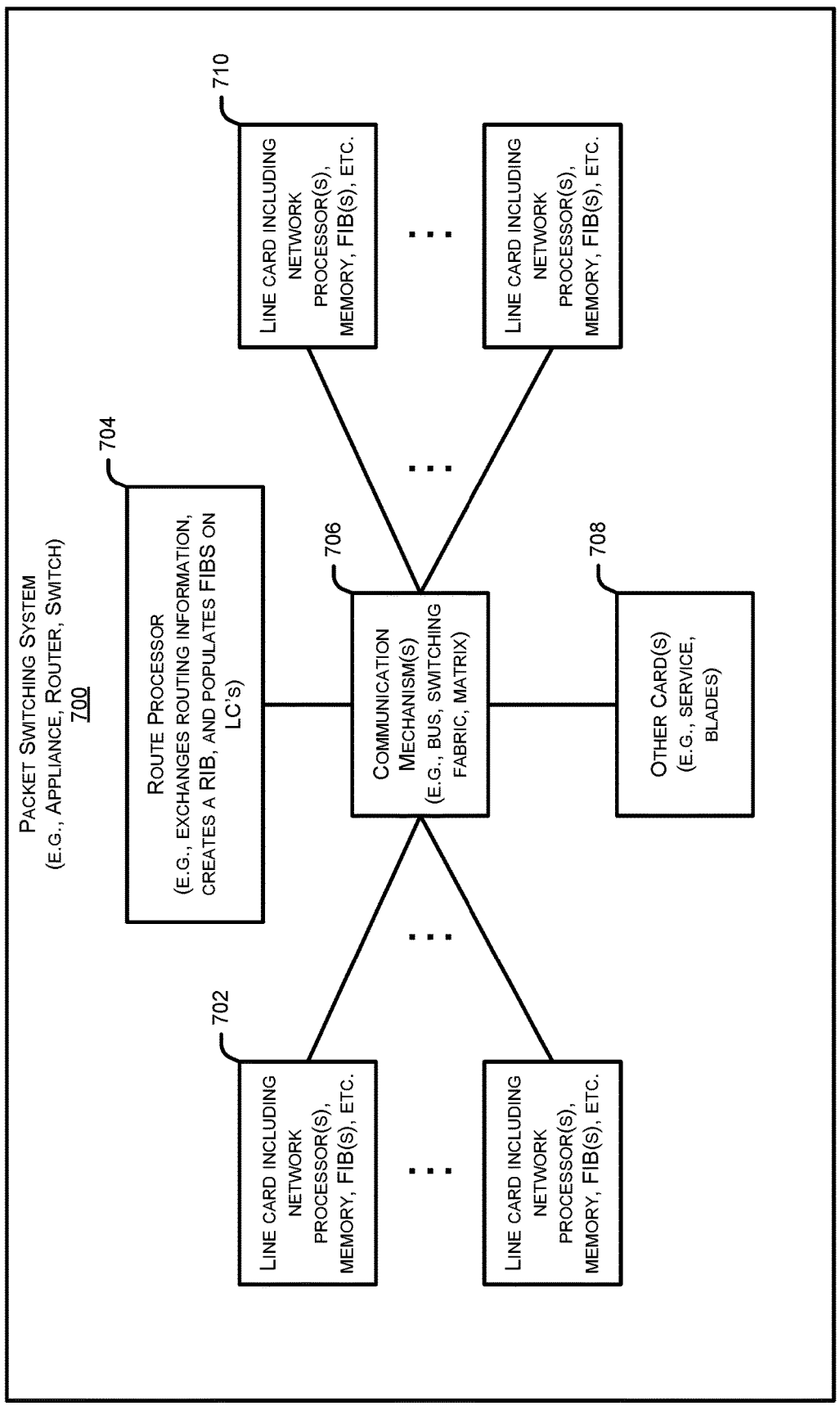
FIG. 7 illustrates a block diagram illustrating an example packet switching device that can be utilized to implement various aspects of the technologies disclosed herein.

FIG. 7 illustrates a block diagram illustrating an example packet switching device (or system) 700 that can be utilized to implement various aspects of the technologies disclosed herein. In some examples, packet switching device(s) 700 may be employed in various networks, such as, for example, core network 104 as described with respect to FIG. 1.

In some examples, a packet switching device 700 may comprise multiple line cards 702 and 710, each with one or more network interfaces for sending and receiving packets over communications links (e.g., possibly part of a link aggregation group). The packet switching device 700 may also have a control plane with one or more processing elements 704 for managing the control plane and/or control plane processing of packets associated with forwarding of packets in a network. The packet switching device 700 may also include other cards 708 (e.g., service cards, blades) which include processing elements that are used to process (e.g., forward/send, drop, manipulate, change, modify, receive, create, duplicate, apply a service) packets associated with forwarding of packets in a network. The packet switching device 700 may comprise hardware-based communication mechanism 706 (e.g., bus, switching fabric, and/or matrix, etc.) for allowing its different entities (e.g., line cards 702 and 710) to communicate. Line cards 702 and 710 may typically perform the actions of being both an ingress and/or an egress line card 702 and 710, in regard to multiple other particular packets and/or packet streams being received by, or sent from, packet switching device 700.

Figure 8:
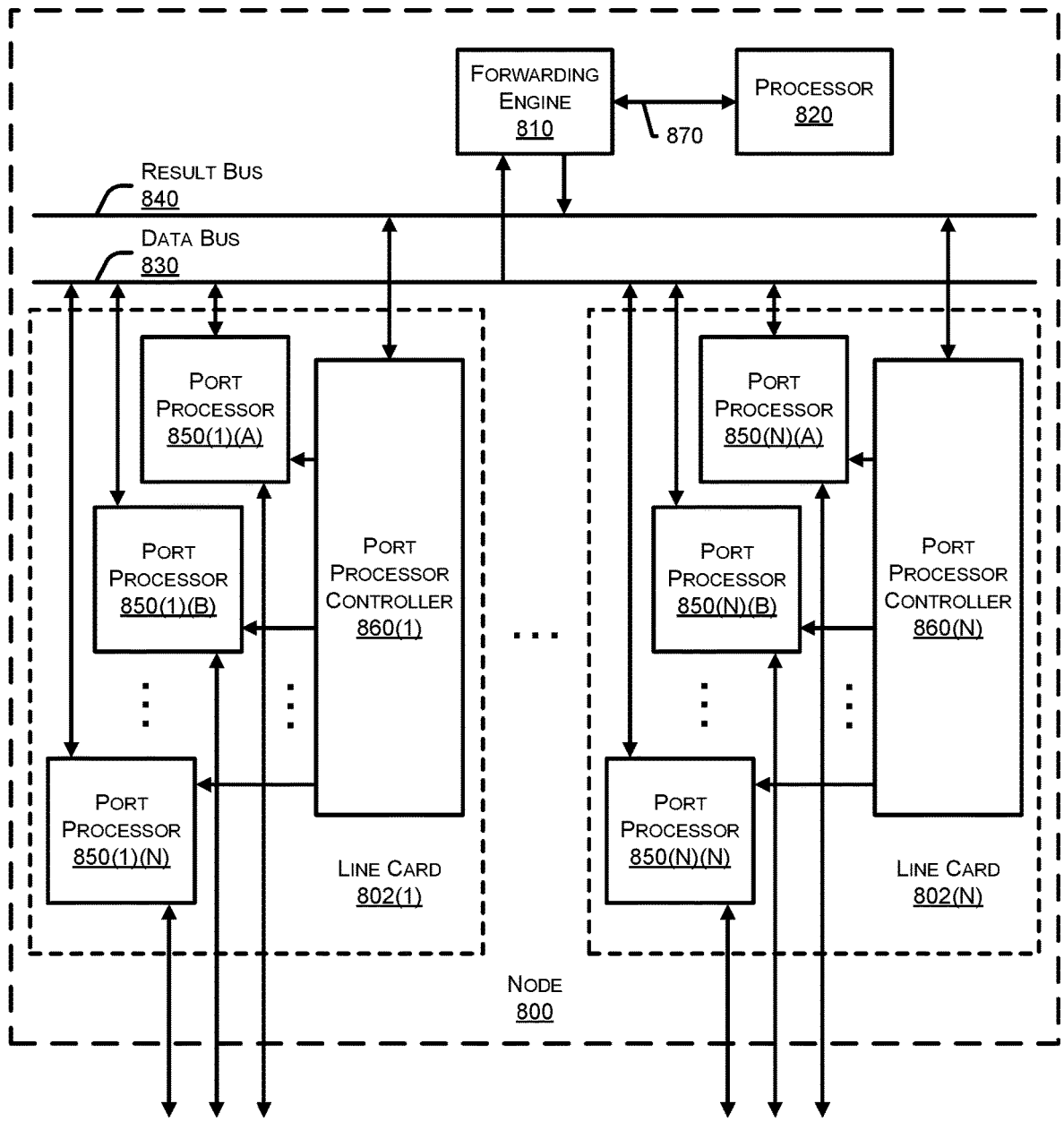
FIG. 8 illustrates a block diagram illustrating certain components of an example node that can be utilized to implement various aspects of the technologies disclosed herein.

FIG. 8 illustrates a block diagram illustrating certain components of an example node 800 that can be utilized to implement various aspects of the technologies disclosed herein. In some examples, node(s) 800 may be employed in various networks, such as, for example, core network 104 as described with respect to FIG. 1.

In some examples, node 800 may include any number of line cards 802 (e.g., line cards 802 (1)-(N), where N may be any integer greater than 1) that are communicatively coupled to a forwarding engine 810 (also referred to as a packet forwarder) and/or a processor 820 via a data bus 830 and/or a result bus 840. Line cards 802 (1)-(N) may include any number of port processors 850 (1)(A)-(N)(N) which are controlled by port processor controllers 860 (1)-(N), where N may be any integer greater than 1. Additionally, or alternatively, forwarding engine 810 and/or processor 820 are not only coupled to one another via the data bus 830 and the result bus 840, but may also communicatively coupled to one another by a communications link 870.

The processors (e.g., the port processor(s) 850 and/or the port processor controller(s) 860) of each line card 802 may be mounted on a single printed circuit board. When a packet or packet and header are received, the packet or packet and header may be identified and analyzed by node 800 (also referred to herein as a router) in the following manner. Upon receipt, a packet (or some or all of its control information) or packet and header may be sent from one of port processor(s) 850 (1)(A)-(N)(N) at which the packet or packet and header was received and to one or more of those devices coupled to the data bus 830 (e.g., others of the port processor(s) 850 (1)(A)-(N)(N), the forwarding engine 810 and/or the processor 820). Handling of the packet or packet and header may be determined, for example, by the forwarding engine 810. For example, the forwarding engine 810 may determine that the packet or packet and header should be forwarded to one or more of port processors 850 (1)(A)-(N)(N). This may be accomplished by indicating to corresponding one(s) of port processor controllers 860 (1)-(N) that the copy of the packet or packet and header held in the given one(s) of port processor(s) 850 (1)(A)-(N)(N) should be forwarded to the appropriate one of port processor(s) 850 (1)(A)-(N)(N). Additionally, or alternatively, once a packet or packet and header has been identified for processing, the forwarding engine 810, the processor 820, and/or the like may be used to process the packet or packet and header in some manner and/or maty add packet security information in order to secure the packet. On a node 800 sourcing such a packet or packet and header, this processing may include, for example, encryption of some or all of the packet's, or packet and header's, information, the addition of a digital signature, and/or some other information and/or processing capable of securing the packet or packet and header. On a node 800 receiving such a processed packet or packet and header, the corresponding process may be performed to recover or validate the packet's, or packet and header's, information that has been secured.

Figure 9:
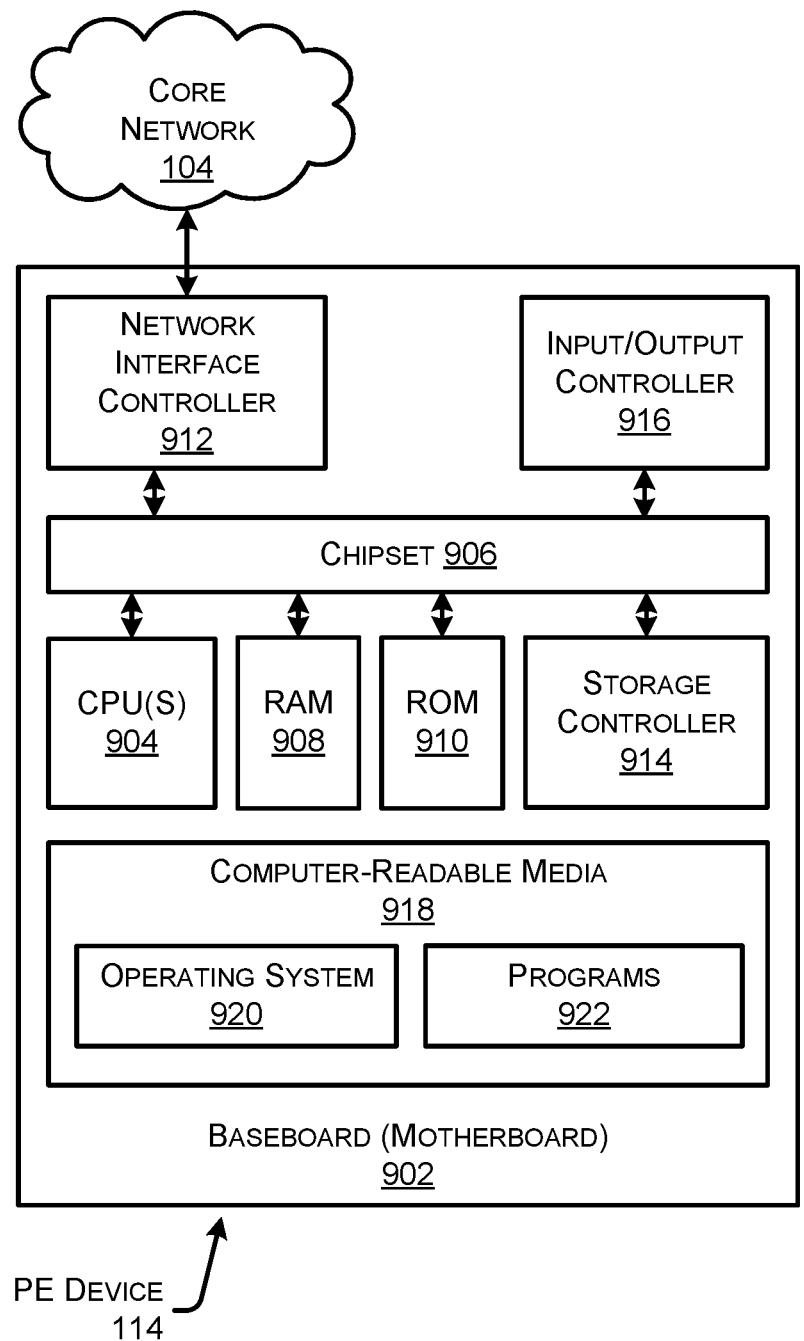
FIG. 9 shows an example computer architecture for a provider edge device capable of executing program components for implementing the functionality described above.

FIG. 9 shows an example computer architecture for a computer 900 (e.g., a provider edge device 114) capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The provider edge device may, in some examples, correspond to a physical server as described herein, and may comprise networked devices such as servers, switches, routers, hubs, bridges, gateways, modems, repeaters, access points, etc.

The provider edge device 114 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the provider edge device 114.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the provider edge device 114 and to transfer information between the various components and devices. The ROM 910 or NVRAM can also store other software components necessary for the operation of the provider edge device 114 in accordance with the configurations described herein.

The provider edge device 114 can operate in a networked environment using logical connections to remote computing devices and computer systems through a network, such as the core network 104. The chipset 906 can include functionality for providing network connectivity through a NIC 912, such as a gigabit Ethernet adapter. The NIC 912 is capable of connecting the provider edge device 114 to other computing devices over the core network 104. It should be appreciated that multiple NICs 912 can be present in the provider edge device 114, connecting the computer to other types of networks and remote computer systems.

The provider edge device 114 can be connected to a storage device 918 that provides non-volatile storage for the computer. The storage device 918 can store an operating system 920, programs 922, and data, which have been described in greater detail herein. The storage device 918 can be connected to the provider edge device 114 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The provider edge device 114 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the provider edge device 114 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The provider edge device 114 can further read information from the storage device 918 by detecting the physical states or characteristics of one or more particular locations within the physical storage units.

In addition to the mass storage device 918 described above, the provider edge device 114 can have access to other computer-readable storage media to store and retrieve information, such as program modules, data structures, or other data. It should be appreciated by those skilled in the art that computer-readable storage media is any available media that provides for the non-transitory storage of data and that can be accessed by the provider edge device 114. In some examples, the operations performed by devices as described herein may be supported by one or more devices similar to provider edge device 114. Stated otherwise, some or all of the operations performed by an edge device, and/or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the provider edge device 114. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the provider edge device 114.

In one embodiment, the storage device 918 or other computer-readable storage media is encoded with computer-executable instructions which, when loaded into the provider edge device 114, transform the computer from a general-purpose computing system into a special-purpose computer capable of implementing the embodiments described herein. These computer-executable instructions transform the provider edge device 114 by specifying how the CPUs 904 transition between states, as described above. According to one embodiment, the provider edge device 114 has access to computer-readable storage media storing computer-executable instructions which, when executed by the provider edge device 114, perform the various processes described above with regard to the other figures. The provider edge device 114 can also include computer-readable storage media having instructions stored thereupon for performing any of the other computer-implemented operations described herein.

The provider edge device 114 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the provider edge device 114 might not include all of the components shown in FIG. 9, can include other components that are not explicitly shown in FIG. 9, or might utilize an architecture completely different than that shown in FIG. 9.

As described herein, the provider edge device 114 may include one or more hardware processors (e.g., CPU 904) (processors) configured to execute one or more stored instructions. The processor(s) may comprise one or more cores. Further, the provider edge device 114 may include one or more network interfaces configured to provide communications between the provider edge device 114 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the core network 104. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 922 may comprise any type of programs or processes to perform the techniques described in this disclosure. The programs 922 may comprise any type of program that cause the computing device to perform techniques for communicating with other devices using any type of protocol or standard usable for determining connectivity. These software processors and/or services may comprise a routing module and/or a Path Evaluation (PE) Module, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing module contains computer executable instructions executed by the processor to perform functions provided by one or more routing protocols. These functions may, on capable devices, be configured to manage a routing/forwarding table (a data structure) containing, e.g., data used to make routing forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (i.e., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing module may implement a process that consists solely of providing mechanisms necessary for source routing techniques. That is, for source routing, other devices in the network can tell the less capable devices exactly where to send the packets, and the less capable devices simply forward the packets as directed.

In various embodiments, as detailed further below, PE Module may also include computer executable instructions that, when executed by processor(s), cause computing device to perform the techniques described herein. To do so, in some embodiments, PE Module may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PE Module may employ one or more supervised, unsupervised, or semi-supervised machine learning models. Generally, supervised learning entails the use of a training set of data, as noted above, that is used to train the model to apply labels to the input data. For example, the training data may include sample input data that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In a core network 104 made up of software defined wide area networks (SD-WANs), traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving, at a first provider edge device, information about a customer edge device in communication with the first provider edge device;
   storing, by the first provider edge device based on the information about the customer edge device, an indication of a first role status of the customer edge device;
   receiving, by the first provider edge device from a second provider edge device in communication with the customer edge device, an advertisement message that includes a second role status associated with the second provider edge device in relation to the customer edge device;
   comparing, by the first provider edge device, the first role status to the second role status; and
   upon determining that the first role status does not match the second role status:
      if the second role status is a leaf role and the first role status is a root role, updating, by the first provider edge device, the first role status of the customer edge device to be a leaf role; and
      if the second role status is a root role status and the first role status is a leaf role, generating a second advertisement message indicating the first role status; and
      transmitting the second advertisement message to the second provider edge device to cause the second provider edge to update the second role status to a leaf role.

2. The method of claim 1, wherein the customer edge device manages access to a local network.

3. The method of claim 1, wherein the first provider edge device manages access to a core network.

4. The method of claim 3, wherein the information about the customer edge device is received during an enrollment of the customer edge device with the core network.

5. The method of claim 1, wherein the first provider edge stores the first role status of the customer edge device within a forwarding table.

6. The method of claim 5, wherein the first role status of the customer edge device is stored in relation to a port associated with the customer edge device.

7. A provider edge device comprising:
   one or more processors; and
   one or more computer-readable media storing instructions that, when executed by the one or more processors, cause the provider edge device to perform operations comprising:
      receiving information about a customer edge device in communication with the provider edge device;
      storing, based on the information about the customer edge device, an indication of a first role status of the customer edge device;
      receiving, from a second provider edge device in communication with the customer edge device, an advertisement message that includes a second role status of the customer edge device; and
      upon detecting a conflict by comparing the first role status to the second role status:
         updating the first role status to be a leaf role if the second role status indicates a leaf role and the first role status is a root role; or generating a second advertisement message to be sent to the second provider edge device if the second role status is a root role and the first role status is a leaf role; and transmitting the second advertisement message to the second provider edge device, wherein the second advertisement message causes the second provider edge device to update the second role status to a leaf status.

8. The provider edge device of claim 7, wherein detecting a conflict comprises determining that the first role status does not match the second role status.

9. The provider edge device of claim 7, wherein the first role status is stored in a forwarding table of the one or more computer-readable media.

10. The provider edge device of claim 7, further comprising storing an indication of a port associated with the customer edge device.

11. A system comprising:
a customer edge device having at least a first processor; and
at least two provider edge devices in communication with the customer edge device, an individual provider edge device of the at least two provider edge devices having at least a second processor and configured to at least:
receive information about the customer edge device;
store, based on the information about the customer edge device, an indication of a first role status for the customer edge device;
broadcast a first advertisement message that includes an identifier for the customer edge device and the first role status;
receive, from a second provider edge device of the at least two provider edge devices, a second advertisement message that includes a second role status for the customer edge device;
upon detecting a conflict by comparing the first role status to the second role status, updating the first role status to a leaf status if the second role status indicates a leaf status and the first role status is a root status;
generate a third advertisement message that includes an identifier for the customer edge device and the first role status; and
transmit the third advertisement message to the second provider edge device to cause the second provider edge device to update the second role status to match the first role status.

12. The system of claim 11, wherein detecting a conflict comprises determining that the first role status does not match the second role status.

13. The system of claim 11, the individual provider edge device of the at least two provider edge devices further configured to at least update the first role status to match the second role status.

14. The system of claim 11, wherein the identifier for the customer edge device comprises a Media Access Control (MAC) address.

15. The system of claim 11, wherein the at least two provider edge devices manage access to a core network.

16. The system of claim 15, wherein the first advertisement message is broadcast to other provider edge devices operating on the core network.

* * * * *